United States Patent
Yu (10) Patent No.: US 8,724,558 B2
(45) Date of Patent: May 13, 2014

(54) CELLULAR TELEPHONES WITH CONFIGURABLE MULTIPLEXER CIRCUITRY AND LOCAL BUS POWER FOR FIELD TESTING

(75) Inventor: Jesse Yu, San Jose, CA (US)

(73) Assignee: Apple Inc., Cupertino, CA (US)

( * ) Notice: Subject to any disclaimer, the term of this patent is extended or adjusted under 35 U.S.C. 154(b) by 380 days.

(21) Appl. No.: 12/641,119

(22) Filed: Dec. 17, 2009

(65) Prior Publication Data

US 2011/0151860 A1    Jun. 23, 2011

(51) Int. Cl.
*H04W 4/00*    (2009.01)
(52) U.S. Cl.
USPC ............................................ 370/329; 455/69
(58) Field of Classification Search
None
See application file for complete search history.

(56) References Cited

U.S. PATENT DOCUMENTS

| | | | |
|---|---|---|---|
| 5,933,776 A | 8/1999 | Kirkpatrick | |
| 6,876,890 B1 | 4/2005 | Oleniczak | |
| 7,689,213 B2 * | 3/2010 | Olgaard et al. | 455/425 |
| 2004/0030413 A1 * | 2/2004 | King et al. | 700/1 |
| 2006/0063980 A1 * | 3/2006 | Hwang et al. | 600/300 |
| 2007/0091814 A1 | 4/2007 | Leung et al. | |
| 2011/0151860 A1 * | 6/2011 | Yu | 455/423 |

* cited by examiner

*Primary Examiner* — Andrew Lai
*Assistant Examiner* — Leon Andrews
(74) *Attorney, Agent, or Firm* — Treyz Law Group; David C. Kellogg (57) ABSTRACT

A field testing system is provided that uses a personal computer tethered to an interface board. A cellular telephone plugs into the interface board during wireless field testing. The cellular telephone may include configurable multiplexer circuitry and power supply circuitry. During normal operation, the cellular telephone is configured so that its application processor is linked to its application processor and to an external bus. During field testing, the cellular telephone is configured to link the baseband unit to the external bus and the interface board. The baseband unit may support advanced communications busses (e.g., USB). To avoid consuming too many pins in the external bus between the interface board and the cellular telephone, power for the USB bus during field testing may be derived from a power management unit in the cellular telephone.

20 Claims, 6 Drawing Sheets

CELLULAR TELEPHONES WITH CONFIGURABLE MULTIPLEXER CIRCUITRY AND LOCAL BUS POWER FOR FIELD TESTING

BACKGROUND

This relates to radio-frequency testing circuitry and, more particularly, to cellular telephones with configurable multiplexer circuitry and local bus power for field testing.

Handheld electronic devices are becoming increasingly popular. Examples of handheld devices include handheld computers, cellular telephones, media players, and hybrid devices that include the functionality of multiple devices of this type.

Due in part to their mobile nature, handheld electronic devices are often provided with wireless communications capabilities. Handheld electronic devices may use wireless communications to communicate with wireless base stations.

As part of developing wireless devices for consumers, manufacturers routinely field test the real-world radio-frequency performance of these devices. Manufacturers also strive to reduce the size and number of components used in these devices. With conventional field testing systems, the devices need dedicated circuitry and external connectors to connect to external testing equipment during field testing. These extra components may take up an undesirably large amount of space in the devices.

It would therefore be desirable to be able to provide improved configurable multiplexer circuitry and local bus power for field testing for electronic devices.

SUMMARY

A cellular telephone may be provided with configurable multiplexer circuitry and local bus power. The cellular telephone may be tested using a field testing system. The system may also include a personal computer tethered to an interface board. The cellular telephone may plug into the interface board during wireless field testing to monitor the operation of a baseband processor in the cellular telephone.

The cellular telephone may include configurable multiplexer circuitry. The configurable multiplexer circuitry may allow external access to a bus that is shared between an applications processor and a baseband processor in the cellular telephone. If desired, the external bus may be a universal serial bus (USB). The configurable multiplexer may couple the baseband processor to the external bus during wireless field testing and may couple the applications processor to the external bus during normal operation. When the configurable multiplexer circuitry couples the cellular telephone's baseband processor to the external bus during wireless testing, the personal computer and the interface board may communicate with the baseband processor over the external bus as part of testing the wireless performance of the cellular telephone (e.g., by analyzing the signals from the baseband processor).

With one suitable arrangement, the cellular telephone may include a power management unit. The power management unit may generate one or more power supply voltages used in the external bus. With this type of arrangement, the number of pins in an external connector of the cellular telephone is reduced because power supply voltages that would otherwise require a pin are provided locally. Reducing the number of pins in the external connector that are used in providing the external bus may be desirable in cellular telephones and other devices in which the number of pins in the external connector is constrained (e.g., when the external connector is pin constrained). If desired, the power management unit may generate control signals that control whether the configurable multiplexer circuitry couples the baseband processor or the applications processor to the external bus.

Further features of the invention, its nature and various advantages will be more apparent from the accompanying drawings and the following detailed description of the preferred embodiments.

DETAILED DESCRIPTION

This relates to radio-frequency field testing circuitry and, more particularly, to electronic devices such as cellular telephones with configurable multiplexer circuitry and local bus power for field testing.

The configurable multiplexer circuitry may allow external pins in a connector in an electronic device to be used for different purposes during normal operation and testing operations. For example, the external pins may be coupled through the configurable multiplexer circuitry to an application processor in the device during normal operation. During testing (e.g., during field testing), the external pins may be coupled through the configurable multiplexer circuitry to baseband circuitry in the device. Using the configurable multiplexer circuitry, the number of pins needed to support normal operation and testing operations may be minimized.

An electronic device may include a power management unit that provides local bus power to serve as a power signal for a communications bus (e.g., a communications bus that includes a power signal on a power line). By providing the power signal locally, the number of external pins needed to support the communications path is minimized.

The electronic devices may be portable electronic devices such as laptop computers or small portable computers of the type that are sometimes referred to as ultraportables. Portable electronic devices may also be somewhat smaller devices. Examples of smaller portable electronic devices include wrist-watch devices, pendant devices, headphone and earpiece devices, and other wearable and miniature devices.

With one suitable arrangement, which is sometimes described herein as an example, the portable electronic devices are handheld electronic devices. Handheld devices may be, for example, cellular telephones, media players with wireless communications capabilities, handheld computers (also sometimes called personal digital assistants), remote controllers, global positioning system (GPS) devices, and handheld gaming devices. The handheld devices may also be hybrid devices that combine the functionality of multiple conventional devices. Examples of hybrid handheld devices include a cellular telephone that includes media player functionality, a gaming device that includes a wireless communications capability, a cellular telephone that includes game and email functions, and a handheld device that receives email, supports mobile telephone calls, and supports web browsing. These are merely illustrative examples.

Figure 1:
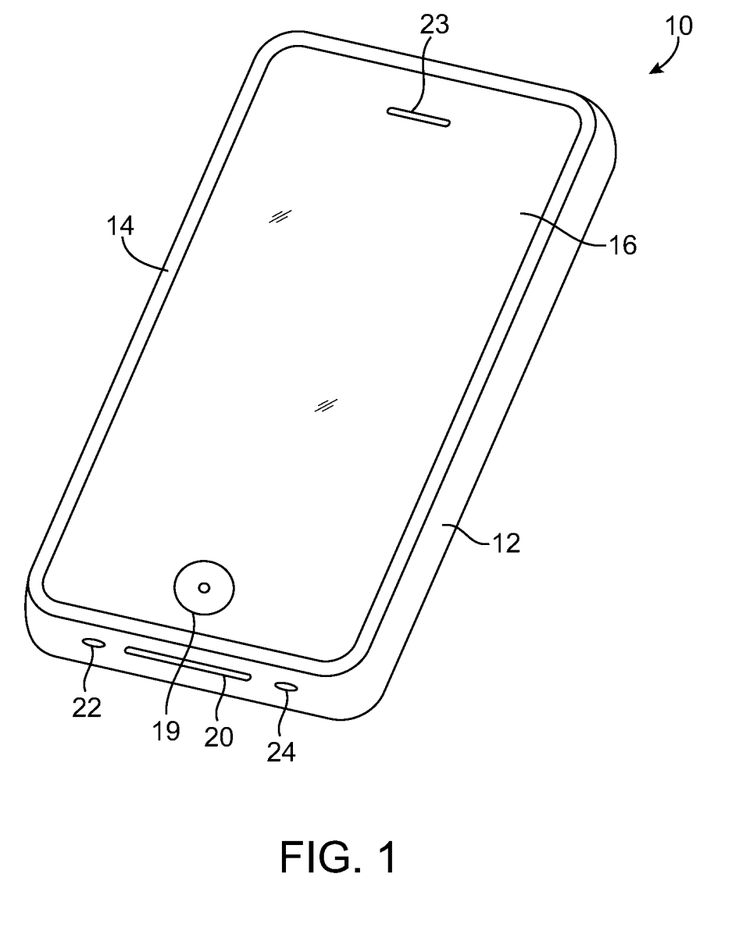
FIG. 1 is a perspective view of an illustrative handheld electronic device that may have configurable multiplexer circuitry and local bus power for field testing in accordance with accordance with an embodiment of the present invention.

An illustrative handheld electronic device such as a cellular telephone in accordance with an embodiment of the present invention is shown in FIG. 1. Device 10 may be any suitable portable or handheld electronic device.

Device 10 may have housing 12. Device 10 may include one or more antennas for handling wireless communications. Embodiments of device 10 that contain one antenna and embodiments of device 10 that contain two or more antennas are sometimes described herein as examples.

Device 10 may handle communications over one or more communications bands. For example, in a device 10 with two antennas, a first of the two antennas may be used to handle cellular telephone communications in one or more frequency bands, whereas a second of the two antennas may be used to handle data communications in a separate communications band. With one suitable arrangement, which is sometimes described herein as an example, the second antenna is configured to handle data communications in a communications band centered at 2.4 GHz (e.g., WiFi and/or Bluetooth® frequencies). If desired, device 10 may communicate using cellular telephone bands at 850 MHz, 900 MHz, 1800 MHz, and 1900 MHz (e.g., the main Global System for Mobile Communications or GSM cellular telephone bands). Device 10 may also use other types of communications links. For example, device 10 may communicate using the WiFi® (IEEE 802.11) band at 2.4 GHz and 5 GHZ and the Bluetooth® band at 2.4 GHz. Communications are also possible in data service bands such as the 3G data communications band at 2170 MHz band (commonly referred to as UMTS or Universal Mobile Telecommunications System).

Housing 12, which is sometimes referred to as a case, may be formed of any suitable materials including, plastic, glass, ceramics, metal, or other suitable materials, or a combination of these materials. Bezel 14 may be used to attach display 16 to housing 12.

Display 16 may be a liquid crystal diode (LCD) display, an organic light emitting diode (OLED) display, a plasma display, multiple displays that use one or more different display technologies, or any other suitable display. The outermost surface of display 16 may be formed from one or more plastic or glass layers. If desired, touch screen functionality may be integrated into display 16 or may be provided using a separate touch pad device.

Handheld electronic device 10 may have user input control devices such as button 19 and input-output components such as port 20 and one or more input-output jacks (e.g., for audio and/or video). Button 19 may be, for example, a menu button. Port 20 may contain a 30-pin data connector (as an example). Openings 24 and 22 may, if desired, form microphone and speaker ports. Opening 23 may form a speaker port.

Figure 2:
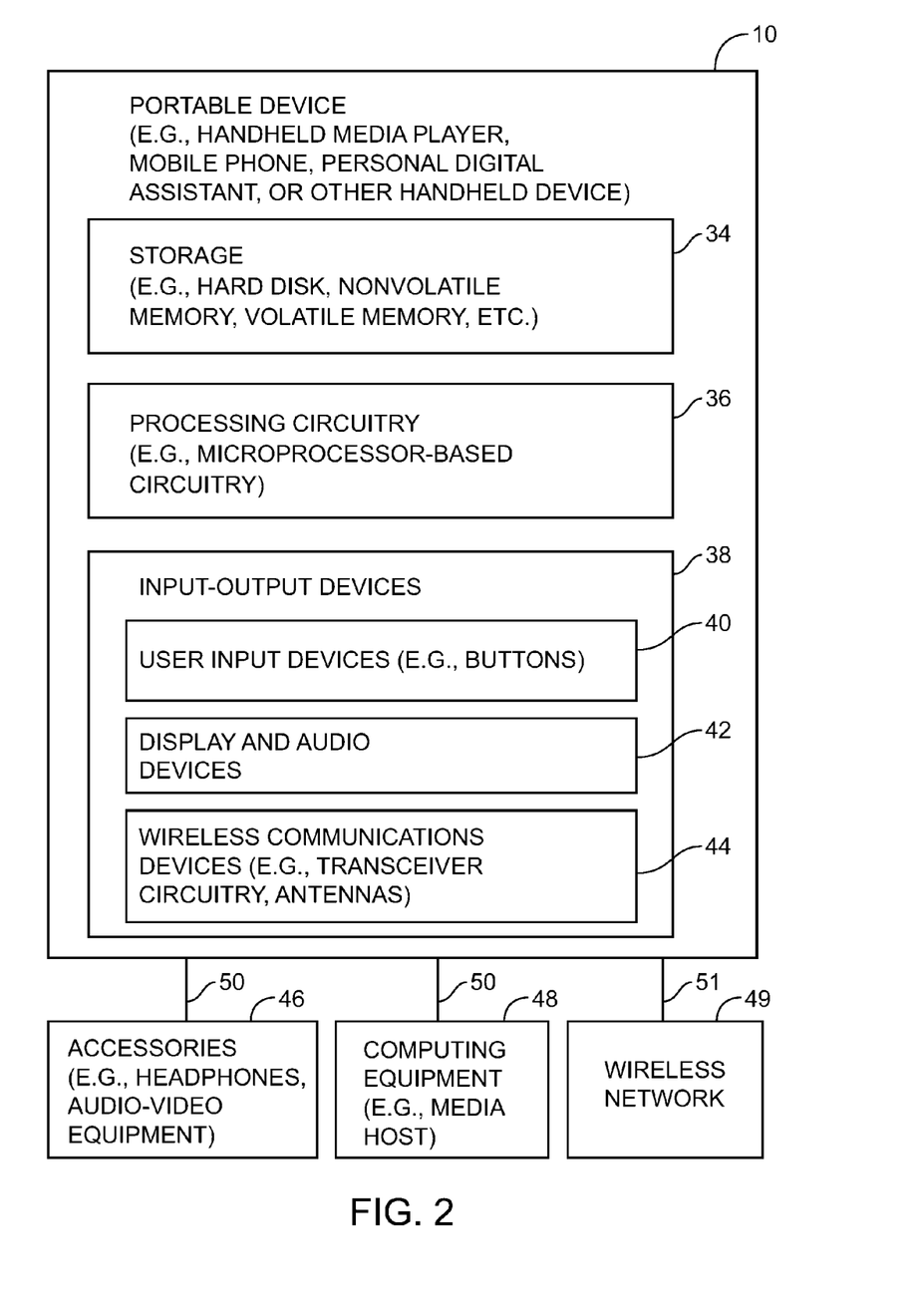
FIG. 2 is a schematic diagram of an illustrative handheld electronic device that may have configurable multiplexer circuitry and local bus power for field testing in accordance with an embodiment of the present invention.

A schematic diagram of an embodiment of an illustrative electronic device is shown in FIG. 2. As shown in FIG. 2, device 10 may include storage 34. Storage 34 may include one or more different types of storage such as hard disk drive storage, nonvolatile memory (e.g., flash memory or other electrically-programmable-read-only memory), volatile memory (e.g., battery-based static or dynamic random-access-memory), etc.

Processing circuitry 36 may be used to control the operation of device 10. Processing circuitry 36 may be based on a processor such as a microprocessor and other suitable integrated circuits. Processing circuitry 36 may include a baseband processor and an applications processor, as examples.

Input-output devices 38 may be used to allow data to be supplied to device 10 and to allow data to be provided from device 10 to external devices. Display screen 16, button 19, microphone port 24, speaker port 22, and dock connector port 20 are examples of input-output devices 38.

Input-output devices 38 can include user input-output devices 40 such as buttons, touch screens, joysticks, click wheels, scrolling wheels, touch pads, key pads, keyboards, microphones, cameras, etc. Display and audio devices 42 may include liquid-crystal display (LCD) screens or other screens, light-emitting diodes (LEDs), and other components that present visual information and status data. Display and audio devices 42 may also include audio equipment such as speakers and other devices for creating sound. Display and audio devices 42 may contain audio-video interface equipment such as jacks and other connectors for external headphones and monitors.

Wireless communications devices 44 may include communications circuitry such as radio-frequency (RF) transceiver circuitry formed from one or more integrated circuits, power amplifier circuitry, passive RF components, transmission lines, one or more antennas, and other circuitry for handling RF wireless signals.

During normal operation, device 10 can communicate with external devices such as accessories 46 and computing equipment 48, as shown by paths 50. Paths 50 may include wired and wireless paths. For example, paths 50 may include wired paths formed using connector 20 of FIG. 1. Accessories 46 may include headphones (e.g., a wireless cellular headset or audio headphones) and audio-video equipment (e.g., wireless speakers, a game controller, other equipment that receives and plays audio and video content), power supplies that provide power to device 10, etc. If desired, device 10 can communicate with external devices such as accessories 46 and computing equipment 48 during field testing.

Computing equipment 48 may be any suitable computer. With one suitable arrangement, computing equipment 48 is a computer that has an associated wireless access point (router) or an internal or external wireless card that establishes a wireless connection with device 10. The computer may be a server (e.g., an internet server), a local area network computer with or without internet access, a user's own personal computer, a peer device (e.g., another electronic device 10), or any other suitable computing equipment. Device 10 may use wireless communications circuitry 44 to communicate with wireless network 49 over wireless path 51.

Figure 3:
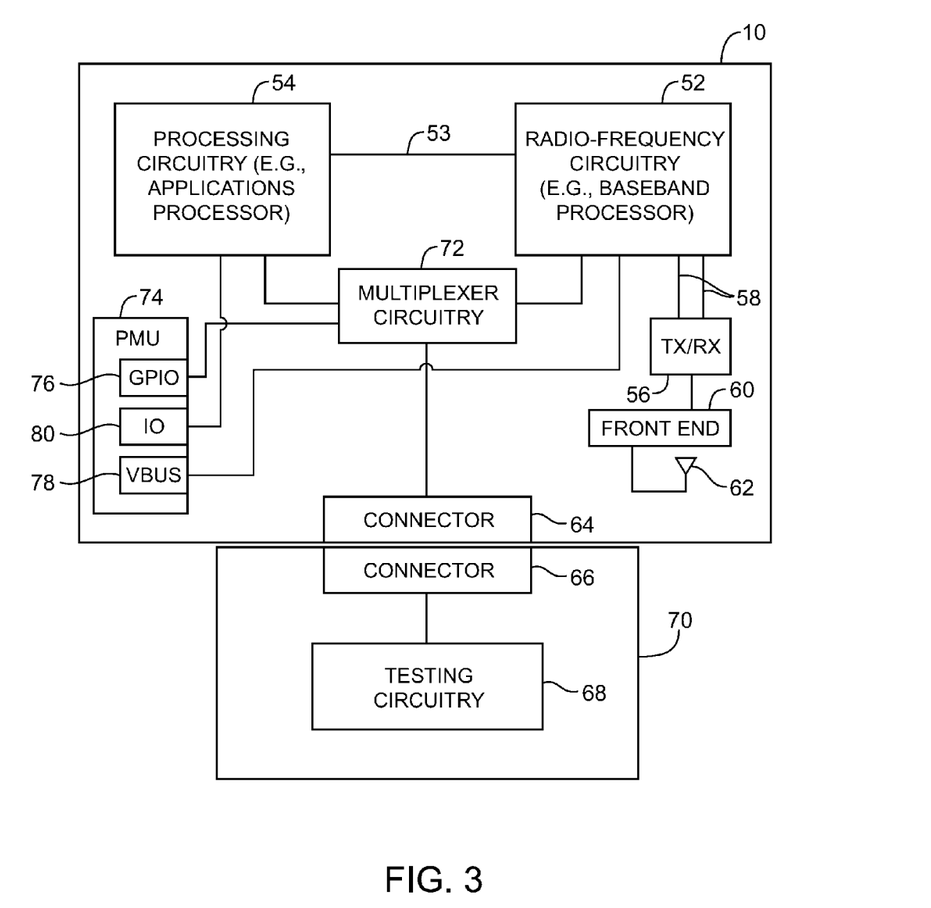
FIG. 3 is a schematic diagram of illustrative circuitry that may include configurable multiplexer circuitry and local bus power for field testing in a handheld electronic device and a testing device in accordance with an embodiment of the present invention.

During field testing, device 10 serves as a "device under test" and may be connected to testing equipment such as testing device 70 (FIG. 3).

As illustrated by FIG. 3, device 10 may include processing circuitry and radio-frequency circuitry. For example, device 10 may include a baseband processor such as baseband processor 52 and an applications processor such as applications processor 54. Additional processors such as digital signal processing circuitry, application-specific integrated circuits, and other processing components may be included in device 10. Applications processor 54 and baseband processor 52 may be used in supporting radio-frequency communications for device 10. Applications processor 54 may be coupled to baseband processor 52 over a communications path such as path 53.

Baseband processor 52 may be connected to transceiver circuitry such as transceiver circuitry 56. Baseband processor 52 may send and receive digital and/or analog signals to and from transceiver circuitry 56 through data paths 58. Transceiver circuitry 56 may include an analog-to-digital converter (ADC), a digital-to-analog converter (DAC), a digital down converters (DDC), and a digital up converter (DUC). As one example, in a scenario in which device 10 is transmitting radio-frequency signals (e.g., when device 10 is transmitting over path 51 to network 49 of FIG. 2), baseband processor 52 may provide digital data (e.g., baseband signals) to the DUC. The DUC may convert or modulate the baseband digital signals to an intermediate frequency (IF). The IF digital signals may be fed to the DAC to convert the IF digital signals to IF analog signals. The IF analog signals may then be fed to a radio-frequency front end such as front end 60.

In a scenario in which device 10 is receiving wireless signals (e.g., when device 10 is receiving radio-frequency signals over path 51 from network 49 of FIG. 2), radio-frequency front end 60 may provide incoming IF analog signals to the ADC. The ADC may convert the incoming IF analog signals to incoming IF digital signals. The incoming IF digital signals may then be feed to the DDC. The DDC may convert the incoming IF digital signals to incoming baseband signals. The incoming baseband digital signals may then be provided to baseband processor 52 for further processing. Transceiver circuitry 56 may sometimes be referred to as an IF stage.

Radio-frequency (RF) front end 60 may include circuitry that couples transceiver circuitry 56 to device antennas such as antenna 62. RF front end 60 may include circuitry such as matching circuits, band-pass filters, mixers, a low noise amplifier (LNA) for incoming signals, a power amplifier (PA) for outgoing signals, etc. In the scenario in which device 10 is transmitting, RF front end 60 may up-convert the IF analog signals from transceiver circuitry 56 to RF analog signals. The RF analog signals may be fed to antenna 62 and broadcast out by device 10. In the scenario in which device 10 is receiving, antenna 62 may receive incoming RF analog signals from a broadcasting device (e.g., from wireless network 49 over path 51).

As shown in FIG. 3, device 10 may include a connector such as connector 64. With one suitable arrangement, connector 64 may be a female 30-pin data connector such as port 20 of FIG. 1. An external testing device such as testing device 70 may be coupled to device 10. For example, during laboratory and field testing, testing device 70 may be connected to device 10.

Testing device 70 may include a connector such as connector 66 that mates with connector 64. With one suitable arrangement, connector 66 may be a male 30-pin data connector that engages with connector 64 in port 20 of device 10. When device 10 is coupled to device 70, testing circuitry 68 in device 70 may be coupled to baseband processor 52 and/or applications processor 54.

If desired, device 10 may include configurable multiplexer circuitry such as multiplexer circuitry 72. During normal operation (e.g., when accessories or devices other than testing device 70 are connected to device 10), multiplexer circuitry 72 may route signals such as universal serial bus (USB) signals between applications processor 54 and connector 64. During testing operations (e.g., when a testing device such a device 70 is connected to device 10), multiplexer circuitry 72 may route signals such as USB signals between baseband processor 52 and connector 64. If desired, multiplexer circuitry 72 may also route signals between processors 52 and 54.

Device 10 may include circuitry such as power management unit (PMU) 74. PMU 74 may include a general-purpose input-output port (GPIO) 76. GPIO 76 may control multiplexer circuitry 72. For example, GPIO 76 may be used to control whether one or more external pins in connector 64 are coupled to applications processor 54 (e.g., during normal operation) or are coupled to baseband processor 52 (e.g., during RF testing operations). PMU 74 may have an input-output port such as IO port 80 that is coupled to applications processor 54. If desired, applications processor 54 may control the operation of PMU 74 by sending control signals to PMU 74 through the path connected to IO port 80.

If desired, PMU 78 may generate a power supply signal on a power supply path such as voltage bus (VBUS) 78. The power supply signal that is supplied from PMU 74 may be routed to baseband processor 52. The power supply signal output from PMU 74 may optionally also be routed to applications processor 54 and/or to multiplexer circuitry 72. With one suitable arrangement, the power supply signal output from PMU 74 may be used to provide a locally generated version of a communications bus power line signal. This makes it unnecessary to use an external pin in connector 64 to receive communications bus power from device 70. This type of arrangement may therefore reduce the number of pins needed to provide a communications bus that includes a power line between processors 52 and 54 and an external device such as testing device 70.

Figure 4:
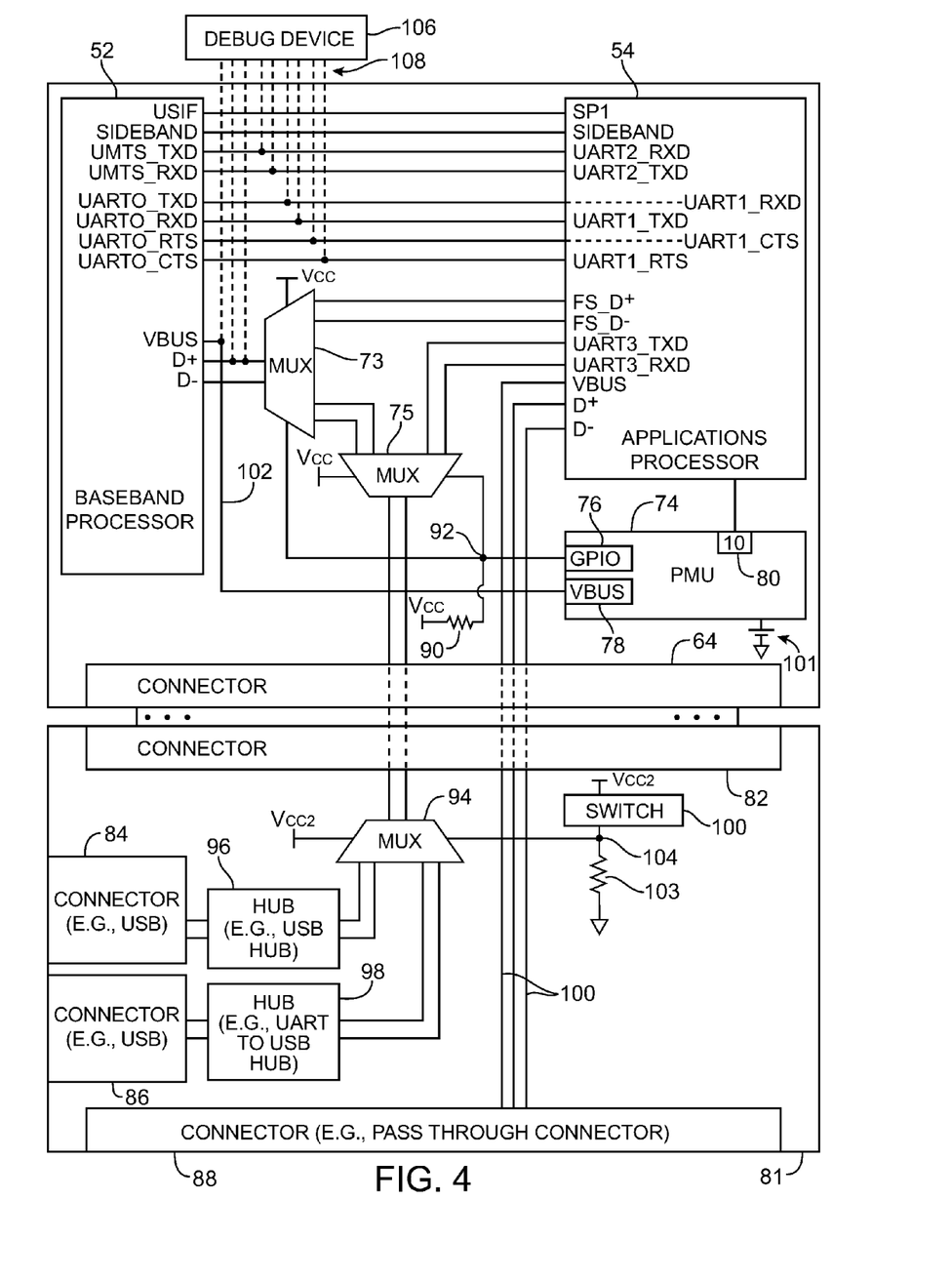
FIG. 4 is a circuit diagram of illustrative testing circuitry in a handheld electronic device and a testing device that may connect to the handheld electronic device during field testing in accordance with an embodiment of the present invention.

A more detailed circuit diagram of the arrangement shown in FIG. 3 is shown in FIG. 4. As shown in the circuit diagram of FIG. 4, a testing interface device such as testing interface device 81 may connect to device 10.

Testing interface device 81 may include a connector 82 that connects to connector 64 of device 10. Testing interface device 81 may include additional connectors such as connectors 84, 86, and 88. With one suitable arrangement, connectors 84 and 86 may be USB connectors that connect to an external testing device such as a personal computer or a laptop computer that is running testing software. During field testing, connector 88 may be connected to external equipment such as accessories 46 and computing equipment 48 (FIG. 2).

Connector 88 may be a 30-pin pass-through connector. As one example, connector 88 may be configured to replicate the functionality of connector 64 for accessories and devices that normally connect to connector 64 (e.g., devices that normally connect to a 30-pin connector in device 10 such as port 20 of FIG. 1). If desired, testing interface device 81 may have a minimal size and may be configured to minimize its impact on the wireless performance of device 10. With this type of arrangement, the radio-frequency performance of device 10 can be measured and tested with minimal impact from the presence of testing interface device 81. In addition, the effects of connecting various accessories and devices to device 10 (e.g., through the 30-pin connector) on the RF performance of device 10 can be measured and tested by connecting the accessories and devices to device 10 through connector 88 of testing interface device 81 while using a testing device connected to connectors 84 and/or 86 of testing interface device 81.

Testing interface device 81 may include a multiplexer such as multiplexer 94. Multiplexer 94 may be controlled by switch 100. Switch 100 may determine whether signals are routed between connector 82 and connector 84 or connector 86. As one example, switch 100 may allow node 104 to float and resistor 103 to pull node 104 to ground when it is desired to route signals between connector 84 and connector 82. Switch 100 may pull node 104 to a power supply voltage such as Vcc2 when it is desired to route signals between connector 86 and connector 82. As shown in the example of FIG. 4, connector 84 may be coupled to connector 82 through a hub such as USB hub 96 and connector 86 may be coupled to connector 82 through a hub such as universal asynchronous receiver-transmitter (UART) hub 98.

Device 10 may include multiplexer circuitry such as multiplexers 73 and 75. Multiplexers 73 and 75 may be powered by a positive power supply voltage Vcc and may be controlled by signals from GPIO 76 of PMU 74. As one example, GPIO 76 may allow path 92 to float. As path 92 floats, a resistor such as resistor 90 that is tied to a positive power supply line carrying Vcc can pull path 92 towards Vcc, thereby configuring multiplexers 73 and 73 to route signals for testing operations. During normal operation, GPIO 76 may pull path 92 low, thereby configuring multiplexers 73 and 75 to route signals for normal operation.

As part of the testing of baseband processor 52, multiplexers 73 and 75 may be configured to route USB signals between baseband processor 52 and testing interface device (and then to a testing device through connector 84). As an example, signals from ports D+ and D− (e.g., a differential pair of USB data signals) of baseband processor 52 may be routed to a test device so that the test device can communication with baseband processor 54.

Because USB busses typically require power signals (e.g., a 5.0 volt positive power signal and a 0.0 ground signal), PMU 74 may generate USB-spec power signals on power supply line VBUS 78 from an internal power source such as battery 101. The USB power signals may be routed internally to baseband processor 52 by line 102, thereby obviating the need for external USB power during testing and reducing the number of pins consumed in connectors 64 and 82. If the USB power signals had been supplied from connector 82, an extra conductive line would have been required between connectors 64 and 82.

As part of testing applications processor 54 and during normal operation, multiplexer 75 may route UART signals between applications processor 54 and connector 64. As an example, UART signals from ports UART3_TXD and UART3_RXD of applications processor 54 may be routed to a test device (e.g., during testing) or to accessories and other devices (e.g., during normal operation). During testing of applications processor 54 and during normal operation, multiplexer 73 may optionally route USB signals between baseband processor 52 and applications processor 54. For example, signals may be routed between pins D+ and D− of baseband processor 52 and pins FS_D+ and FS_D− of applications processor 54.

As shown in FIG. 4, baseband processor 52 and applications processor 54 may be interconnected by a number of conductive lines and paths. For example, baseband processor 52 may have ports USIF, SIDEBAND, UMTS_TXD and UMTS_RXD (e.g., universal mobile telecommunications transmitting and receiving ports), UART0_TXD, UART0_RXD, UART0_CTS, and UART0_RTS. Applications processor 52 may have ports SPI, SIDEBAND, UART2_RXD, UART2_TXD, UART1_RXD, UART1_TXD, UART1_CTS, and UART1_RTS.

As shown by dashed lines 108, a testing and/or debug device such as debug device 106 may be connected to the conductive lines and paths between baseband processor 52 and applications processor 54. Typically, debug device 106 is used during laboratory testing (rather than during field testing) as connecting to the lines between processors 52 and 54 may include opening housing 12 of device 10 to gain access to the interior of device 10.

USB signals from applications processor 54 may be routed over communications lines 100 to external devices. For example, VBUS power signals and D+ and D− USB data signals may be routed over lines 100, through connectors 64 and 82, and to an external accessory or device that connects to connector 88.

Figure 5:
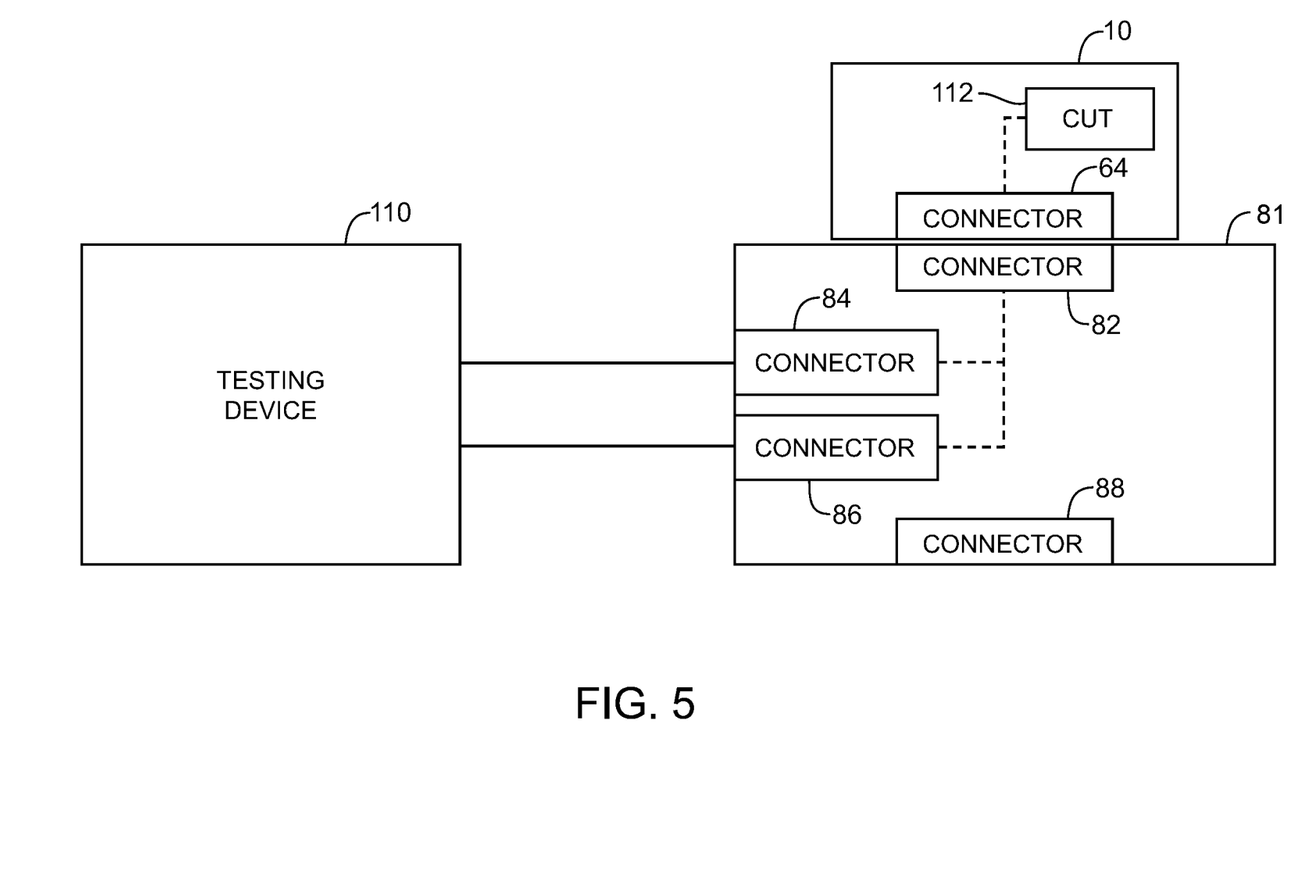
FIG. 5 is a schematic diagram of an illustrative testing interface device, a testing device, and a device under test that shows how the testing device may be coupled to the device under test through the testing interface device during field testing in accordance with an embodiment of the present invention.

FIG. 5 illustrates how a testing device such as testing device 110 may connect to device 10 through testing interface device 81 of FIG. 4. As shown in FIG. 5, testing device 110 may connect to a circuit under test (CUT) such as CUT 112 (e.g., a circuit such as baseband processor 52 and applications processor 54 of FIG. 4). Testing device 110 may connect to CUT 112 through connectors 84, 86, and 82 of test interface device 88 and through connector 64 of device 10 (as examples).

Figure 6:
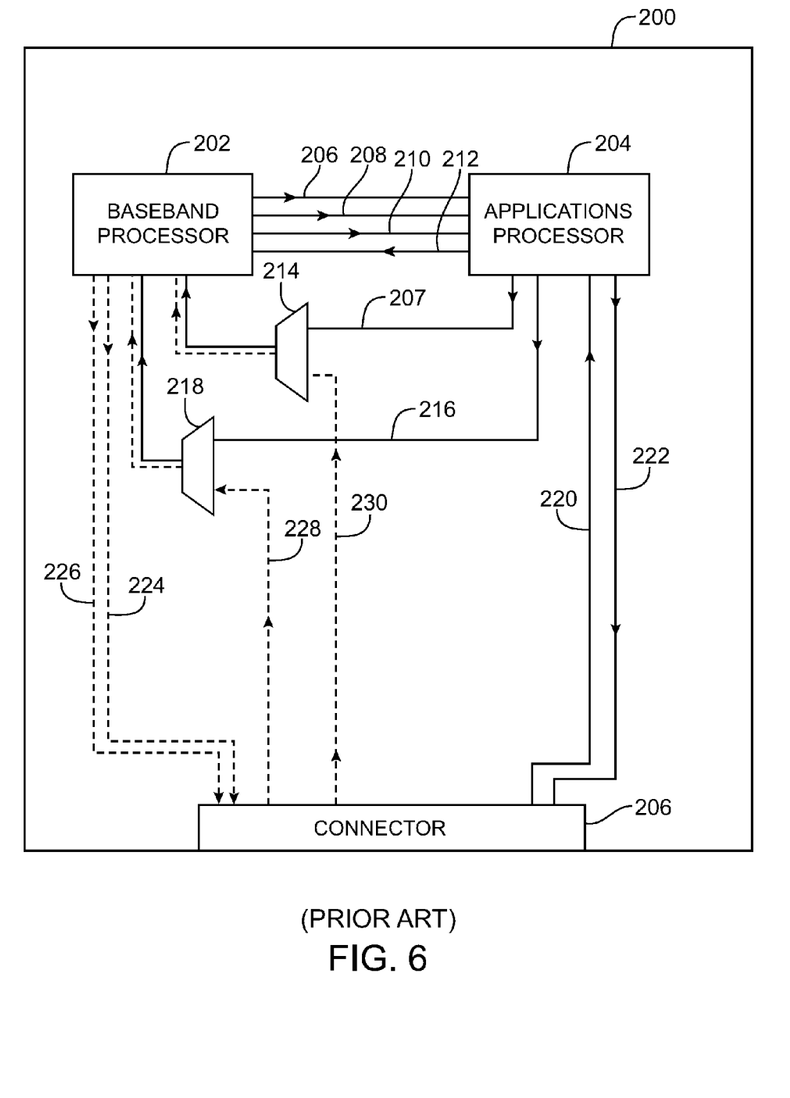
FIG. 6 is a circuit diagram of a conventional cellular telephone with multiplexer circuitry to support testing.

A conventional cellular telephone with multiplexer circuitry to support testing is shown in FIG. 6. As shown in FIG. 6, device 200 includes baseband processor 202 and applications processor 204 connected to external 30-pin connector 206. The solid conductive paths in FIG. 6 are active during normal operation and the dotted conductive paths are active during testing operations.

Baseband processor 202 includes a universal asynchronous receiver/transmitter (UART) communications bus formed from paths 206 and 207 between processors 202 and 204. Path 207 runs through multiplexer 214 and is routed to baseband processor 202 during normal operation. Path 206 is also active during normal operation.

Paths 208, 210, 212, and 216 form a UART communications bus between processors 202 and 204. During normal operations, paths 208, 210, and 212 are active and multiplexer 218 routes path 216 to baseband processor 202.

During normal operation, paths 220 and 222 form a bidirectional UART communications bus between applications processor 204 and connector 206.

During testing operations, paths 224 and 230 form a UART communications bus and paths 226 and 228 form a UART communications bus between connector 206 and baseband processor 202. Multiplexer 218 routes path 228 of the UART communications bus to processor 202 and multiplexer 214 routes path 230 of the UART communications bus to processor 202 during testing operations.

The foregoing is merely illustrative of the principles of this invention and various modifications can be made by those skilled in the art without departing from the scope and spirit of the invention.

What is claimed is:

1. An electronic device, comprising:
   a baseband processor;
   an applications processor;
   an input-output port;
   configurable multiplexer circuitry that routes signals in a communications bus that includes a power supply line between the baseband processor, the applications processor, and the input-output port; and
   a circuit that supplies a positive power supply voltage to the baseband processor along a path that does not pass through the applications processor, the configurable multiplexer circuitry, or the input-output port when an external test device is coupled to the input-output port during testing of the electronic device, wherein the baseband processor uses the positive power supply voltage as the power supply line in the communications bus.

2. The electronic device defined in claim 1 wherein the input-output port comprises a plurality of input-output pins and wherein none of the input-output pins carry a power supply signal that is associated with the communications bus while the external test device is coupled to the input-output port during testing of the electronic device.

3. The electronic device defined in claim 1 wherein the baseband processor has a universal serial bus (USB) communications bus port coupled to the input-output port through the configurable multiplexer circuitry.

4. The electronic device defined in claim 1 wherein the applications processor has a universal asynchronous receiver-transmitter (UART) communications bus port coupled to the input-output port through the configurable multiplexer circuitry.

5. The electronic device defined in claim 1 wherein the baseband processor has a communications bus port that is connected to a pair of differential data lines.

6. The electronic device defined in claim 1 wherein the configurable multiplexer circuitry comprises a first multiplexer and a second multiplexer.

7. The electronic device defined in claim 1 wherein the circuit has a control input coupled to the applications processor and wherein the circuit has a control output that is coupled to a control terminal in the first multiplexer and that is coupled to a control terminal in the second multiplexer.

8. The electronic device defined in claim 1 wherein:
the configurable multiplexer circuitry comprises a first multiplexer and a second multiplexer;
the first multiplexer is configured to route signals between the second multiplexer and the input-output port during testing of the electronic device;
the second multiplexer is configured to route signals between the first multiplexer and the baseband processor during testing of the electronic device; and
the first multiplexer is configured to route signals between the applications processor and the input-output port during normal operation.

9. An electronic device, comprising:
first and second processors each having a bidirectional communications bus;
wireless communications circuitry coupled to the first processor;
an input-output port having a connector configured to receive external connectors;
configurable multiplexer circuitry that couples the bidirectional communications bus of the first processor to the input-output port during wireless communications testing such that signals in the bidirectional communication bus associated with the first processor pass bidirectionally through the configurable multiplexer circuitry and between the input-output port and the first processor during wireless communications testing and that couples the bidirectional communications bus of the second processor to the input-output port during normal operation such that signals in the bidirectional communication bus associated with the second processor pass bidirectionally through the configurable multiplexer circuitry and between the input-output port and the second processor during normal operation, wherein the bidirectional communications bus of the first processor includes a power supply line; and
a circuit that supplies a positive power supply voltage to the power supply line when an external test device is coupled to the input-output port during wireless communications testing of the electronic device.

10. The electronic device defined in claim 9 wherein the first processor comprises a baseband processor and wherein the bidirectional communications bus of the first processor comprises a universal serial bus (USB) communications bus having differential data lines.

11. The electronic device defined in claim 10 wherein the connector of the input-output port comprises a plurality of pins and wherein none of the pins carry a power supply signal that is associated with the universal serial bus (USB) communications bus when the external test device is coupled to the input-output port during wireless communications testing of the electronic device.

12. The electronic device defined in claim 11 wherein the second processor comprises an applications processor, wherein the circuit has a control port coupled to the applications processor, and wherein the circuit has an output coupled to at least one control terminal in the configurable multiplexer circuitry.

13. The electronic device defined in claim 9 wherein the configurable multiplexer circuitry comprises a first multiplexer and a second multiplexer.

14. The electronic device defined in claim 9 wherein:
the configurable multiplexer circuitry comprises a first multiplexer and a second multiplexer;
the first multiplexer is configured to route signals between the second multiplexer and the input-output port during wireless communications testing;
the second multiplexer is configured to route signals between the first multiplexer and the first processor during wireless communications testing; and
the first multiplexer is configured to route signals between the second processor and the input-output port during normal operation.

15. The electronic device defined in claim 9 wherein:
the configurable multiplexer circuitry comprises a first multiplexer and a second multiplexer;
the first multiplexer is configured to route signals between the second multiplexer and the input-output port during wireless communications testing;
the second multiplexer is configured to route signals between the first multiplexer and the first processor during wireless communications testing;
the first multiplexer is configured to route signals between the second processor and the input-output port during normal operation; and
the second multiplexer is configured to route signals between the second processor and the first processor during normal operation.

16. The electronic device defined in claim 9 wherein the second processor includes an additional communications bus connected to the input-output port.

17. Testing circuitry for a cellular telephone, comprising:
a baseband processor in the cellular telephone;
an applications processor in the cellular telephone, wherein the baseband processor and the applications processor each have a bidirectional communications bus;
a port in the cellular telephone that relays data signals between a testing device and the baseband processor during wireless testing and that relays data signals between the applications processor and an external device during normal operation; and
configurable multiplexer circuitry in the cellular telephone that couples the bidirectional communications bus of the baseband processor to the port during wireless testing such that signals in the bidirectional communication bus associated with the baseband processor pass bidirectionally through the configurable multiplexer circuitry and between the input-output port and the baseband processor during wireless testing and that couples the bidirectional communications bus of the applications processor to the port during normal operation such that signals in the bidirectional communication bus associated with the applications processor pass bidirectionally through the configurable multiplexer circuitry and between the input-output port and the applications processor during normal operation.

18. The testing circuitry defined in claim 17 wherein the bidirectional communications bus of the baseband processor comprises a universal serial bus (USB) communications bus having differential data lines.

19. The testing circuitry defined in claim 18 wherein the universal serial bus (USB) communications bus includes a power supply line and wherein the testing circuitry further comprises:
a circuit in the cellular telephone that is configured to supply a positive power supply voltage to the power supply line of the universal serial bus (USB) communications bus when an external test device is coupled to the port during wireless testing.

20. Testing circuitry for a cellular telephone, comprising:
a baseband processor in the cellular telephone;
an applications processor in the cellular telephone, wherein the baseband processor and the applications processor each have a bidirectional communications bus;
a port in the cellular telephone that relays data signals between a testing device and the baseband processor during wireless testing and that relays data signals between the applications processor and an external device during normal operation; and
configurable multiplexer circuitry in the cellular telephone that couples the bidirectional communications bus of the baseband processor to the port during wireless testing and that couples the bidirectional communications bus of the applications processor to the port during normal operation, wherein:
the configurable multiplexer circuitry comprises a first multiplexer and a second multiplexer;
the first multiplexer is configured to route signals between the second multiplexer and the port during wireless testing;
the second multiplexer is configured to route signals between the first multiplexer and the baseband processor during wireless testing; and
the first multiplexer is configured to route signals between the applications processor and the port during normal operation.

\* \* \* \* \*